US008760962B2

(12) United States Patent
Kloss

(10) Patent No.: US 8,760,962 B2
(45) Date of Patent: Jun. 24, 2014

(54) METHOD FOR ADJUSTING THE SENSITIVITY OF ULTRASONIC SENSORS

(75) Inventor: Florian Kloss, Zwickau (DE)

(73) Assignee: Robert Bosch GmbH, Stuttgart (DE)

( * ) Notice: Subject to any disclaimer, the term of this patent is extended or adjusted under 35 U.S.C. 154(b) by 65 days.

(21) Appl. No.: 13/504,991

(22) PCT Filed: Oct. 6, 2010

(86) PCT No.: PCT/EP2010/064868
§ 371 (c)(1),
(2), (4) Date: Jul. 16, 2012

(87) PCT Pub. No.: WO2011/064025
PCT Pub. Date: Jun. 3, 2011

(65) Prior Publication Data
US 2012/0275263 A1 Nov. 1, 2012

(51) Int. Cl.
*G01S 7/52* (2006.01)
(52) U.S. Cl.
USPC .............................................. 367/13
(58) Field of Classification Search
USPC .................................... 367/13, 138
See application file for complete search history.

(56) References Cited

U.S. PATENT DOCUMENTS

| | | | |
|---|---|---|---|
| 4,500,977 A | 2/1985 | Gelhard | |
| 5,059,946 A | 10/1991 | Hollowbush | |
| 5,235,315 A | 8/1993 | Cherry et al. | |
| 6,226,226 B1 | 5/2001 | Lill et al. | |
| 6,683,560 B2 | 1/2004 | Bauhahn | |
| 2002/0084930 A1 | 7/2002 | Bauhahn | |
| 2005/0180530 A1 | 8/2005 | Reiche | |
| 2009/0251990 A1 | 10/2009 | Preissler | |
| 2012/0275263 A1* | 11/2012 | Kloss | ............... 367/13 |

FOREIGN PATENT DOCUMENTS

| | | | |
|---|---|---|---|
| DE | 19536000 | 4/1997 | |
| DE | 19645339 | 5/1998 | |
| DE | 60117407 | 8/2006 | |
| DE | 102007026688 | 12/2008 | |
| EP | 2144081 | 1/2010 | |
| GB | 2443206 | 4/2008 | |
| WO | WO 2011/064025 | * 6/2011 | ................ G01S 7/52 |

OTHER PUBLICATIONS

International Search Report, PCT International Application No. PCT/EP2010/064868, dated Dec. 15, 2010.

* cited by examiner

*Primary Examiner* — Daniel Pihulic
(74) *Attorney, Agent, or Firm* — Kenyon & Kenyon LLP

(57) ABSTRACT

A method for adjusting the sensitivity of ultrasonic sensors for detecting the distance of objects from a vehicle. A sensor sensitivity is set selected so that a sonic lobe is transmitted which has an intersection with the ground. A measurement is determined using the sensor, objects in the surroundings of the vehicle having a greater distance from the vehicle than the distance from the sensor to the intersection of the sonic lobe with the ground, so the distance from the sensor to the intersection of the lobe with the ground is detected as being the shortest distance from an object. The sensitivity of the sensor is set as a function of the distance between the sensor and the intersection of the lobe with the ground, so after sensitivity is set, the lobe, at its point closest to the ground, does not fall below a specified distance from the ground.

7 Claims, 2 Drawing Sheets

METHOD FOR ADJUSTING THE SENSITIVITY OF ULTRASONIC SENSORS

FIELD OF THE INVENTION

The present invention relates to a method for adjusting the sensitivity of ultrasonic sensors for detecting distances of objects from a vehicle.

BACKGROUND INFORMATION

Systems including distance-measuring sensors are particularly used in systems for parking support for a driver of a motor vehicle. Using the distance measuring sensors, the distance between the vehicle and an object is recorded. For this purpose, a signal is sent by the sensor in customary sensors and an echo reflected by an object is received. From the propagation time of the signal between the sending of the signal and the reception of the echo one is able to ascertain the distance of the object from the sensor. Sensors used for the distance measurement are currently ultrasonic sensors, radar sensors, infrared sensors or LIDAR sensors, for example.

It is common to all these sensors that the signal, sent by an object that is located in the emission cone, is reflected and the echo is received by the sensor. Information on the direction towards the object cannot be ascertained thereby.

If the emission cone of the sent signal intersects with the ground, such as a road on which the vehicle is traveling, the ground is also detected as an object in the surroundings of the vehicle. Since, however, the ground does not represent any obstacle, the detection of the ground and the hint of an object at a distance of the spacing from the ground to the driver is not desired.

A method is described in German Published Application DE-T 601 17 407, by which, when using radar sensors, one is able to exclude the ground as an object that is able to be an obstacle. For this, after the installation of the sensor, a measurement is carried out, and the measured signals are stored as background noise. This background noise is then subtracted from the measured signals, so as to detect objects.

The method described in DE-T 601 17 407 cannot be used on ultrasonic sensors, however. At this time, the setting of ultrasonic sensors takes place after their installation in the vehicle. For the purpose of detecting only obstacles, and not the ground, this yields a restriction in the height of installation of ultrasonic sensors and a restriction in the visual direction of the sensors. In addition, the use in commercial vehicles, in particular, is possible only to a limited degree, since, on account of big differences in height because of varying loading states and/or the load leveling system of vehicles, the setting of the sensor would have to be adjusted in each case to the level of the vehicle, so as to prevent, at varying distances of the sensors from the ground, the roadway from being detected.

SUMMARY

An example method according to present invention for adjusting the sensitivity of ultrasonic sensors, for detecting distances of objects from a vehicle, includes:
(a) adjusting a sensor sensitivity, which is selected so that a sonic lobe is transmitted by the ultrasonic sensor, which has an intersection with the ground,
(b) carrying out a measurement using the ultrasonic sensor, objects in the surroundings of the vehicle having a greater distance from the vehicle than the distance from the ultrasonic sensor to the intersection of the sonic lobe with the ground, so that the distance from the ultrasonic sensor to the intersection of the sonic lobe with the ground is detected as being the shortest distance from an object, and
(c) adjusting the sensitivity of the ultrasonic sensor as a function of the distance detected in step (b) between the ultrasonic sensor and the intersection of the sonic lobe with the ground, so that after the adjustment, the sonic lobe at its point closest to the ground, does not fall below a specified distance from the ground.

Within the scope of the present invention, that region is designated as the sonic lobe in which a signal sent by the ultrasonic sensor is so strong that the echo of the signal reflected by an object is still received by the ultrasonic sensor and is able to be detected as the echo associated with the signal that was sent.

The intersection of the sonic lobe with the ground is a function of the height of the installation of the ultrasonic sensors. By the use of the method according to the present invention, it may thus be ensured that a system including ultrasonic sensors for distance detection, functions to support the driver, while he is driving the vehicle, independently of the height of installation of the ultrasonic sensors. Using the method according to the present invention, the sensitivity of the ultrasonic sensors is able to be adjusted optimally to the height of installation in the vehicle. The sensitivity of the sensors is always adjusted, in this case, so that there is no detection of the ground. If the ground is detected, the adjusted sensitivity of the ultrasonic sensors is too high. However, flat obstacles also have to be detected. If flat obstacles were not detected, the sensitivity of the ultrasonic sensors would be to low. The specified distance between the point of the sonic lobe closest to the ground and the ground is selected in this instance, so that flat obstacles are still detected, and preferably furthermore in such a way that, at a change in the level of the vehicle, for instance by its being loaded, a renewed adjustment of the sensitivity is not required. Alternatively, it is however also possible, of course, particularly when a level change, and thus a change in the height of installation of the ultrasonic sensors has taken place, to reset the sensitivity of the ultrasonic sensors as a function of the changed height of installation.

In one specific embodiment of the present invention, before adjusting the sensitivity of the ultrasonic sensor, the height of installation of the ultrasonic sensor is determined from the distance between the ultrasonic sensor and the intersection of the sonic lobe with the ground. This has the advantage that the adjustment of the sensitivity of the ultrasonic sensor is able to take place directly as a function of the height of installation. To do this, it is possible, for example, to store a characteristics curve in which the respective sensitivities of the ultrasonic sensor are assigned to the height of installation. However, since, at a constant aperture angle of the sonic lobe, the height of installation is a direct function of the distance of the intersection of the sonic lobe with the ground and the ultrasonic sensor, the adjustment of the sensitivity may, of course, also be ascertained directly from the distance, detected in step (b), between the intersection of the sonic lobe with the ground and the ultrasonic sensor.

In order to be able to assign the distance of the intersection of the sonic lobe with the ground to the ultrasonic sensor unequivocally to the height of installation, it is possible, for example, to store a height of installation assigned to the measured distance between the intersection of the sonic lobe with the ground and the ultrasonic sensor, in each case as a function of the sensitivity of the ultrasonic sensors. Alternatively, it is however also possible to calculate the height of installation from the distance of the ultrasonic sensor from the intersection of the sonic lobe and the ground and the sensitivity of the ultrasonic sensor.

Carrying out the measurement using the ultrasonic sensor in step (b) preferably takes place when the system is not presently needed. This is the case, for example during travel at higher speed or even during standstill, since the system is generally needed when the vehicle is being parked, and thus moves slowly.

Within the scope of the present invention, as travel at higher speed one should understand particularly travel at a speed of more than 30 km/h. In order to ensure that a measurement is performed at standstill, it is preferred to carry out a measurement at standstill only when the vehicle is not in gear and/or the parking brake has been applied. A vehicle is usually not moved when the parking brake has been applied. A vehicle that is not in gear cannot be moved.

When the example method, according to the present invention, for adjusting the sensitivity of ultrasonic sensors is carried out at a standstill, one should also take care that there are no objects closer to the ultrasonic sensor than the intersection of the sonic lobe with the ground. If the object were closer to the vehicle, this would lead to a faulty setting of the sensitivity of the ultrasonic sensors, and the sonic lobe set would have an intersection with the ground, so that in operation of the system, the ground would be detected.

In order to verify the sensitivity of the ultrasonic sensors set in step (c) and the height of installation of the ultrasonic sensors ascertained by the method according to the present invention, it is possible, for instance, that at least two different, sensitivities of the ultrasonic sensor are set, that the distance of the ultrasonic sensor from the intersection of the respective sonic lobe with the ground is determined using each of the sensitivities, the height of installation is calculated from the distances, and the calculated heights of installation are compared to each other. It may be determined by the comparison whether the measurements have supplied correct results. If different heights of installation are yielded, the measurement has to be repeated, since at least one of the results is faulty. In order to take into account measuring tolerances and rounding errors in the determination of the height of installation, it is not necessary for the heights of installation determined at different sensitivities to be identical, but they should not exceed a specified maximum difference. The specified maximum difference is a function of the system used, in this instance, and of the measuring accuracies and rounding errors that are to be expected.

For the verification one may use, for example, two different specified sensitivities of the ultrasonic sensor. Alternatively, it is also possible to use a plurality of, for instance, continuously changing sensitivities of the ultrasonic sensors. For the verification, it is necessary, in each case, for the intersection of the sonic lobe with the ground to exist.

In one preferred specific embodiment of the present invention, the verification of the setting of the sensitivity takes place continually during the operation of the vehicle. This has the advantage that, because of the continual verification, even differences in the height of installation, which come about, for example, because of differences in height, for instance, based on different loading states and/or load leveling systems of the vehicle, are able to be compensated for. The ultrasonic sensors are adjusted in each case as a function of the vehicle level which comes about, for instance, due to the loading state or a load leveling system.

The setting of the sensitivity of the ultrasonic sensor may take place, for example, using a stored sensor characteristics curve. Alternatively, it is also possible to ascertain a characteristics curve adjusted to the situation, for setting the sensitivity of the ultrasonic sensor. If a stored characteristics curve is used, one may, in particular, store the reflecting characteristic of the ultrasonic sensor, and with that, also the conversion factor of the distance at a specified sensitivity for the height of installation.

This conversion factor may be ascertained before installing the ultrasonic sensor by calibration measurements, for example. A sensor characteristics curve adjusted to the instantaneous situation may be ascertained, for example, by varying individual characteristics curve data points. A boundary value is designated as the characteristics curve data point which defines which echo amplitude has to be at least present at a certain distance in the measuring area, so that one is able to carry out an evaluation. In this way, the sensitivity is regulated as a function of the distance. Consequently, for each data point, that is, for each distance, or rather each distance range, which is recorded for ascertaining the sensor characteristics curve, it may be ascertained at which amplitude and sensitivity the ground is detected. It is possible, for example, first to begin very sensitive for each distance, then to lower the sensitivity and thus to ascertain as of which sensitivity the ground is no longer detected. To this value one may still add a safety value, to avoid a ground echo.

The example method according to the present invention is suitable for use, for example, in systems for supporting the driver during parking, which may be retroactively fitted onto a vehicle, and also for the use of systems that are used in commercial vehicles.

BRIEF DESCRIPTION OF THE DRAWINGS

Exemplary embodiments of the present invention are depicted in the figures and are explained in more detail below.

DETAILED DESCRIPTION OF EXAMPLE EMBODIMENTS

Figure 1:
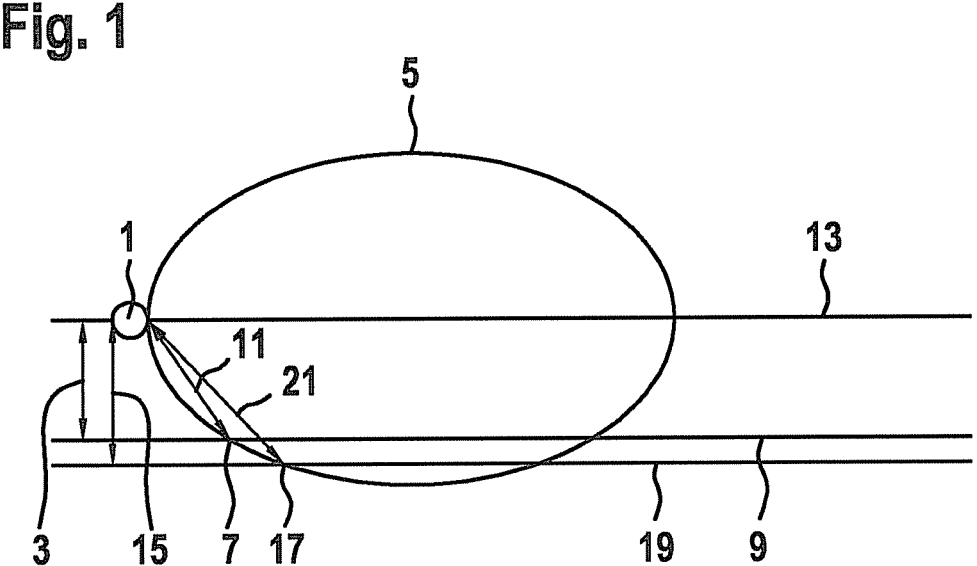
FIG. 1 shows a schematic representation for distance determination at different heights of installation.

FIG. 1 shows a schematic representation for determining distance at different heights of installation.

In order to set the sensitivity of an ultrasonic sensor 1, used for distance detection, in such a way that in the operation of a system using the ultrasonic sensor, for instance, of a system for parking support, the ground is not detected as being an obstacle, the sensitivity of ultrasonic sensor 1 has to be adjusted to its height of installation 3. At too high a sensitivity of ultrasonic sensor 1, a sonic lobe 5 emitted by ultrasonic sensor 1 is shaped so that it has an intersection 7 with the ground 9. This leads to the signal sent by ultrasonic sensor 1 being reflected by ground 9, and the reflected echo being received. In this way, ground 9 is also detected as an object in the range of ultrasonic sensor 1. Since ground 9, however, does not represent any obstacle, data on the distance of ground 9 from ultrasonic sensor 1 are not desired. For this reason, the sensitivity of ultrasonic sensor 1 has to be adjusted in such a way that sonic lobe 5 has no intersection 7 with ground 9 in running operation.

In order to adjust the sensitivity of ultrasonic sensor 1 used for the distance measuring in such a way that, in running operation, ground 9 is not detected, at first a high sensitivity is set of ultrasonic sensor 1. Because of the high sensitivity of ultrasonic sensor 1, there comes about a sonic lobe 5, which has an intersection 7 with ground 9. After the sensitivity of ultrasonic sensor 1 has been set so that sonic lobe 5 has an intersection 7 with ground 9, a measurement is carried out using ultrasonic sensor 1. To this end, a sound pulse is emitted by ultrasonic sensor 1. The sonic pulse is reflected by ground 9, and the echo thus reflected is received again by ultrasonic sensor 1. From the propagation time of the signal, and while taking into account the speed of sound, one is able, in this manner, to calculate the distance of ultrasonic sensor 1 from the point at which the sound pulse was reflected. If an intersection of sonic lobe 5 with ground 9 develops, and there is no further object within the range of sonic lobe 5, the shortest distance detected by ultrasonic sensor 1 is distance 11 of intersection 7 of sonic lobe 5 with ground 9 to ultrasonic sensor 1. Since sonic lobe 5 does not usually run at a right angle to axis 13 of the ultrasonic sensor, detected distance 11 does not correspond to the shortest way between ultrasonic sensor 1 and ground 9, and thus not to height of installation 3.

From the adjusted sensitivity of ultrasonic sensor 1 and sonic lobe 5 specified by the sensitivity, which is known, one is, however, able to determine height of installation 3 from distance 11 of intersection 7 of sonic lobe 5 with ground 9 to ultrasonic sensor 1. Thus, it is possible, for example, to store height of installation 3 belonging respectively to each distance 11, for each possible distance 11 at maximum possible sensitivity of ultrasonic sensor 1. Alternatively, it is also possible to calculate the respective height of installation 3 when sonic lobe 5 is known, and thus at an intersection of sonic lobe 5 with ground 9 that is clearly defined in each case and is at a known distance 11.

The ascertainment of height of installation 3 from measured distance 11 of the intersection of sonic lobe 5 with ground 9 and ultrasonic sensor 1 may take place during travel, for example, or even at standstill. If the measurement is made during travel of the vehicle, this is preferably carried out when the vehicle is moving at a higher speed, for instance, at a speed of more than 15 km/h. Such a speed indicates that the vehicle is not currently undertaking any maneuvering, such as a parking maneuver, and that the system is not being used. In addition, during travel, there is usually no object within sonic lobe 5.

For comparison, FIG. 1 also shows the distance determination at a greater height of installation.

At a greater height of installation 3, intersection 17 of sonic lobe 5 with ground 19 is displaced not only in the direction of greater height of installation 15, but also in the axial direction. Measured distance 21 between ultrasonic sensor 1 and intersection 17 of sonic lobe 5 with ground 19 is thus also clearly greater. Here too, there also occurs an intersection of sonic lobe 5 with ground 19, so that greater height of installation 15 may be ascertained from greater distance 21.

In the case of a commercial vehicle, in particular, in which height of installation 3, 15 of ultrasonic sensor 1 from ground 9, 19, for example, is able to change based on the loading state and/or based on the load leveling, it is possible, for example, to determine height of installation 15, once using an empty vehicle and once to determine height of installation 3 using a loaded vehicle. The sensitivity of ultrasonic sensor 1 may then be set in such a way that the sonic lobe, both for the empty vehicle and for the loaded vehicle, has no intersection with ground 9, 19, and in this way it may always be used for distance detection during maneuvering.

Figure 2:
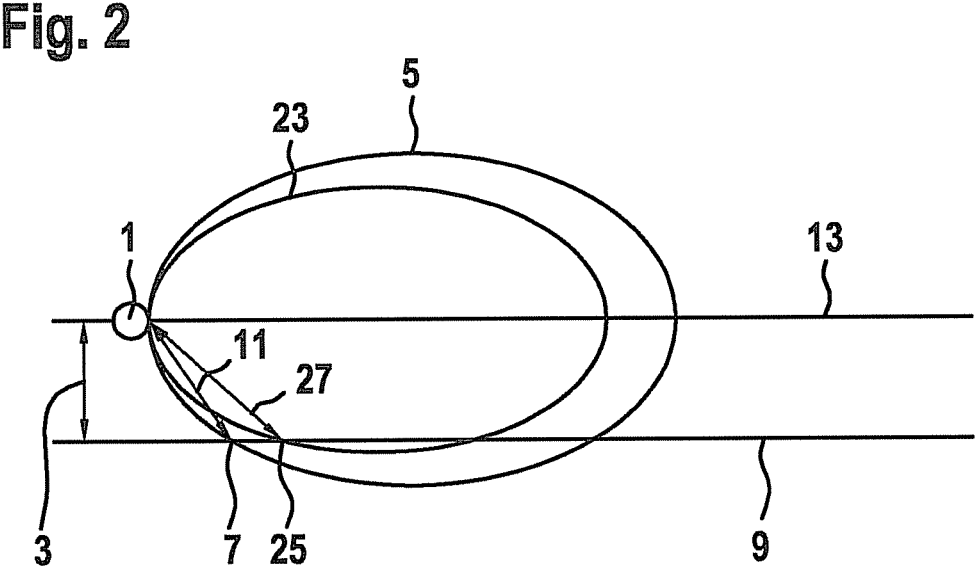
FIG. 2 shows a schematic representation for distance determination at various sensor sensitivities.

FIG. 2 schematically shows a distance determination at various sensor sensitivities. In order to verify height of installation 3, which was ascertained according to the example method described in FIG. 1, it is possible, for example, to carry out a second measurement having a lesser sensitivity of the ultrasonic sensor. When a measurement is carried out at a lesser sensitivity, a second sonic lobe 23 comes about that is different from sonic lobe 5. Based on the lesser sensitivity of second sonic lobe 23, it has an intersection 25 with ground 9 which has a greater axial distance from ultrasonic sensor 1. This leads to distance 27 from intersection 25 to ultrasonic sensor 1 being greater than distance 11 of the intersection of sonic lobe 5 with ground 9. At known sensor characteristics, and thus at a known curve of sonic lobe 23, which comes about at a lower sensitivity of ultrasonic sensor 1, one may also draw a conclusion, directly from the distance of intersection 25 of sonic lobe 23 with ground 9 from ultrasonic sensor 1, on what the height of installation 3 is. When the measurements are correct, in each case, essentially the same values should be yielded for heights of installation 3 determined at different sensitivities. In this context, the values for height of installation 3 may differ, for example, based on measurement accuracy and rounding errors. If there is too great a difference in height of installation 3 determined using different sensitivities, the measurement should be repeated. As too great a difference one would designate in this case a difference that exceeds a specified value. The specified value, in this instance, is made dependent on possible measurement accuracy, which could, for example, come about from the type of ultrasonic sensor used, and rounding errors coming about, for example, from the calculation of the distance.

Figure 3:
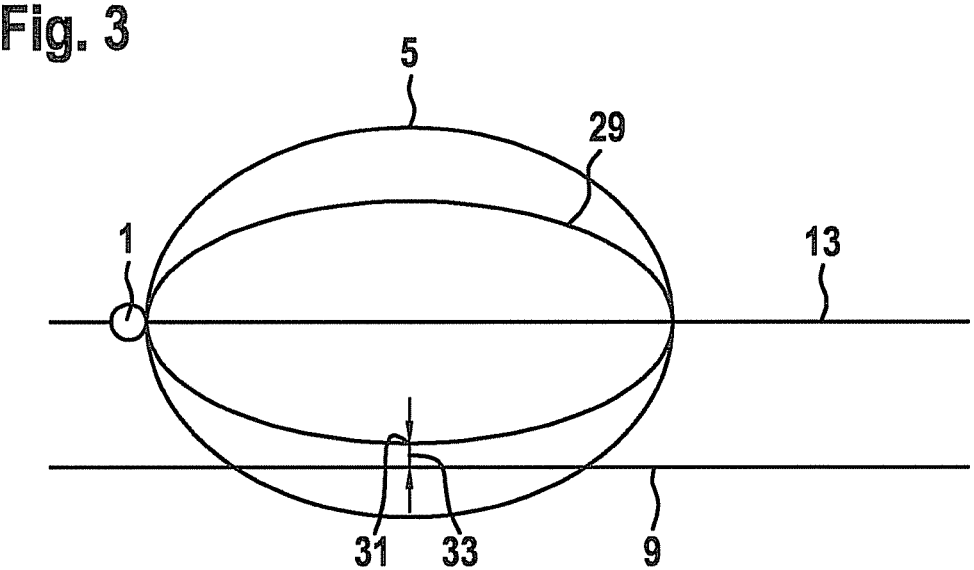
FIG. 3 shows a representation of the sensor characteristics curve at an adjusted sensor sensitivity.

FIG. 3 shows a sonic lobe at a sensor sensitivity that is set, in comparison to a sonic lobe at maximum possible sensor sensitivity.

Sonic lobe 5 having maximum sensitivity is used, to determine height of installation 3 of ultrasonic sensor 1 from ground 9. However, in order to be able to use the sensor to ascertain the distance from obstacles, particularly during a parking process, it is necessary that ground 9 be not detected by ultrasonic sensor 1. Based on the generally lower height of installation 3 of ultrasonic sensor 1, the ground would otherwise always represent the nearest object to ultrasonic sensor 1, and ultrasonic sensor 1 cannot be utilized for supporting the driver. In order to avoid that ground 9 is detected by ultrasonic sensor 1, the sensitivity of ultrasonic sensor 1 is selected so that a sonic lobe 29 is yielded, which, at its point 31, that lies closest to the ground, has a distance 33 from ground 9, which does not fall below a specified distance. The specified distance, in this case, is selected so that, on one hand, ground 9 is not detected as being an obstacle, and on the other hand, however, even flat obstacles, in particular those that have such a height that driving over them could lead to damage of the vehicle, are detected.

The specified distance between point 31 of sonic lobe 29 lying closest to ground 9 and ground 9 is preferably selected, in addition, in such a way that if there are fluctuations in height of installation 3, which may come about, for instance, because of different load states or based on the setting of load leveling, in each case there is no contact of sonic lobe 29 with ground 9. This is shown in exemplary fashion for three different levels in FIG. 4.

Figure 4:
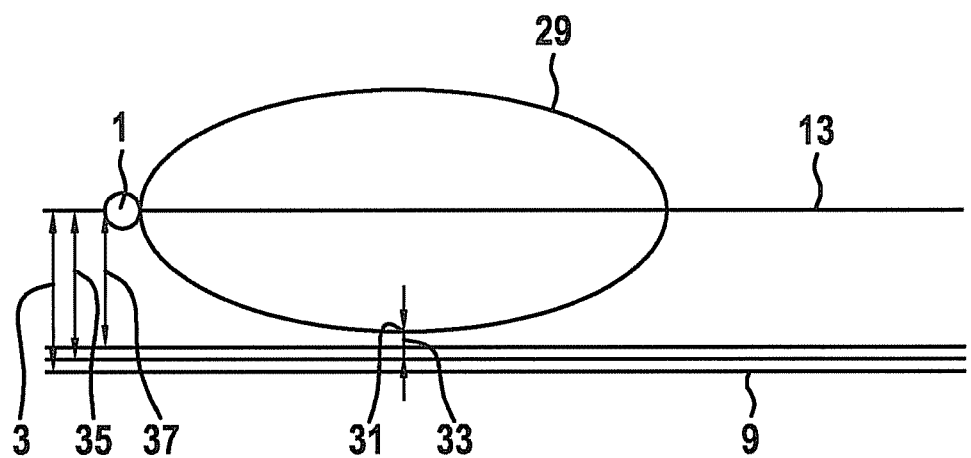
FIG. 4 shows a suitable adjusted sensitivity of the ultrasonic sensor adjusted for various heights of installation.

FIG. 4 once shows height of installation 3 for an empty vehicle, a height of installation 35 for a vehicle having average loading and a height of installation 37 for a fully loaded vehicle. In order to obtain in each case optimal distance 33 between sonic lobe 29 and ground 9, it is also possible, besides a fixed setting of the sensitivity of ultrasonic sensors 1, to ascertain height of installation 3 continuously, and to adjust the sensitivity in each case to the current loading state and current height of installation 3. The continuous ascertainment of height of installation 3, in this instance, may also take place either at standstill or during travel of the vehicle. If the ascertainment takes place during travel of the vehicle, the kind of travel selected for this is especially that in which the system is not in use for detecting obstacles, that is, particularly travel at high speed.

What is claimed is:

1. A method for adjusting a sensitivity of an ultrasonic sensor for detecting distances of objects from a vehicle, comprising:
 (a) adjusting a sensor sensitivity, which is selected so that a sonic lobe is transmitted by the ultrasonic sensor which has an intersection with ground;
 (b) carrying out a measurement using the ultrasonic sensor, objects in surroundings of the vehicle having a greater distance from the vehicle than a distance from the ultrasonic sensor to the intersection of the sonic lobe with the ground, so that the distance from the ultrasonic sensor to the intersection of the sonic lobe with the ground is detected as being a shortest distance from an object; and
 (c) adjusting the sensitivity of the ultrasonic sensor as a function of the distance detected in step (b) between the ultrasonic sensor and the intersection of the sonic lobe with the ground, so that after the adjustment of the sensitivity, the sonic lobe, at its point that is closest to the ground, does not fall below a specified distance from the ground, wherein a height of installation of the ultrasonic sensor in the vehicle is determined, before the setting of the sensitivity of the ultrasonic sensor, from the distance between the ultrasonic sensor and the intersection of the sonic lobe with the ground.

2. The method as recited in claim 1, wherein the measurement in step (b) is carried out during travel at one of a higher speed or at standstill.

3. A method for adjusting a sensitivity of an ultrasonic sensor for detecting distances of objects from a vehicle, comprising:
 (a) adjusting a sensor sensitivity, which is selected so that a sonic lobe is transmitted by the ultrasonic sensor which has an intersection with ground;
 (b) carrying out a measurement using the ultrasonic sensor, objects in surroundings of the vehicle having a greater distance from the vehicle than a distance from the ultrasonic sensor to the intersection of the sonic lobe with the ground, so that the distance from the ultrasonic sensor to the intersection of the sonic lobe with the ground is detected as being a shortest distance from an object, wherein the measurement is carried out during travel at one of a higher speed or at standstill; and
 (c) adjusting the sensitivity of the ultrasonic sensor as a function of the distance detected in step (b) between the ultrasonic sensor and the intersection of the sonic lobe with the ground, so that after the adjustment of the sensitivity, the sonic lobe, at its point that is closest to the ground, does not fall below a specified distance from the ground, wherein the measurement in step (b) is carried out during travel at one of a higher speed or at standstill, wherein the measurement is carried out at a standstill only if the vehicle is at least one of not in gear, and a parking brake is operated.

4. The method as recited in claim 1, wherein, for verifying the ascertained height of installation, at least two different sensitivities of the ultrasonic sensor are set, using each of the sensitivities, the distance of the ultrasonic sensor from the intersection of the respective sonic lobe with the ground is determined, from the distances respectively the height of installation is calculated and the calculated heights of installation are compared to one another.

5. The method as recited in claim 4, wherein the verifying of the setting of the sensitivity takes place continuously during operation of the vehicle.

6. A method for adjusting a sensitivity of an ultrasonic sensor for detecting distances of objects from a vehicle, comprising:
 (a) adjusting a sensor sensitivity, which is selected so that a sonic lobe is transmitted by the ultrasonic sensor which has an intersection with ground;
 (b) carrying out a measurement using the ultrasonic sensor, objects in surroundings of the vehicle having a greater distance from the vehicle than a distance from the ultrasonic sensor to the intersection of the sonic lobe with the ground, so that the distance from the ultrasonic sensor to the intersection of the sonic lobe with the ground is detected as being a shortest distance from an object; and
 (c) adjusting the sensitivity of the ultrasonic sensor as a function of the distance detected in step (b) between the ultrasonic sensor and the intersection of the sonic lobe with the ground, so that after the adjustment of the sensitivity, the sonic lobe, at its point that is closest to the ground, does not fall below a specified distance from the ground, wherein the setting of the sensitivity of the ultrasonic sensor takes place using a stored sensor characteristics curve.

7. A method for adjusting a sensitivity of an ultrasonic sensor for detecting distances of objects from a vehicle, comprising:
 (a) adjusting a sensor sensitivity, which is selected so that a sonic lobe is transmitted by the ultrasonic sensor which has an intersection with ground;
 (b) carrying out a measurement using the ultrasonic sensor, objects in surroundings of the vehicle having a greater distance from the vehicle than a distance from the ultrasonic sensor to the intersection of the sonic lobe with the ground, so that the distance from the ultrasonic sensor to the intersection of the sonic lobe with the ground is detected as being a shortest distance from an object; and
 (c) adjusting the sensitivity of the ultrasonic sensor as a function of the distance detected in step (b) between the ultrasonic sensor and the intersection of the sonic lobe with the ground, so that after the adjustment of the sensitivity, the sonic lobe, at its point that is closest to the ground, does not fall below a specified distance from the ground, wherein a characteristics curve adjusted to a situation is ascertained for setting the sensitivity of the ultrasonic sensor.

* * * * *